Patented July 3, 1951

2,559,155

UNITED STATES PATENT OFFICE 2,559,155

METHOD OF PREPARING POLYMERS OF ACRYLONITRILE

Earl C. Chapin and George E. Ham, Dayton, Ohio, assignors to Monsanto Chemical Company, St. Louis, Mo., a corporation of Delaware No Drawing. Application January 30, 1948,
Serial No. 5,483

10 Claims. (Cl. 260—85.5)

This invention relates to a new method of preparing valuable copolymers by the conjoint polymerization of acrylonitrile and vinyl aromatic hydrocarbons. More specifically the method provides a means for preparing copolymers having unusually desirable chemical and physical properties.

Acrylonitrile and styrene are known to form mass copolymers, but, except for a limited range of proportions, they cannot be prepared in clear, transparent state. Although it is known that copolymers of less than 70 percent acrylonitrile can be molded the products so obtained do not have satisfactory tensile and flexural strengths. Furthermore, emulsion copolymers are known to be non-uniform and apparently incompatible throughout most of the range of monomer proportions.

The primary purpose of this invention is to provide a method by which clear and transparent copolymers may be prepared throughout wide ranges of monomer proportions. A further purpose of this invention is to provide a method of preparing copolymers having unusually high tensile and flexural properties, and to provide uniform copolymers capable of being spun into high tenacity fibers. The new method also provides an easily controlled method of preparing high quality copolymers of either styrene or alpha-methyl-styrene and acrylonitrile, which copolymers are readily reproducible.

It has been found that when copolymers of acrylonitrile and either styrene or alpha-methylstyrene are prepared, the initial increment of copolymer involves the copolymerization of the monomers in substantially different proportions than are present in the mixture of monomers in the reaction zone. This is especially true of emulsion copolymers when the usual water to monomer ratios are present. Under such circumstances the acrylonitrile is less reactive and has the tendency to accumulate in the reaction mass and as the more reactive monomer becomes depleted, marked changes in chemical composition and physical properties occur. In batch lots the first increment of any copolymer will be richer in styrene and the last increment may be polyacrylonitrile with none of, or very little of, the styrene copolymerized therewith.

Other factors besides the monomer proportions affect the chemical and physical properties of the copolymers. The rate of polymerization and the extent of polymerization are influenced by the nature of the polymerization, such as mass, solution or emulsion, the nature of the catalyst, the temperature and many other variable conditions. When emulsion polymerization is used the ratio of water to monomer, the solubility of the monomers in the aqueous phase, the proportion of catalyst, and the quantity of emulsifying agent may be important. Although it is generally desirable to maintain uniform conditions of polymerization, this practice is very difficult to achieve because of the many factors which influence the rate of reaction. Although the exact mechanism of the polymerization reaction has not been conclusively established the practice of polymerization in accordance with the method described and claimed herein results in the formation of copolymers which appear to be very uniform in chemical and physical structure, and which are definitely superior in clarity, tensile strength and flexural strength to copolymers made by prior art methods.

The practice of this invention utilizes an emulsion polymerization which is conducted at a constant reflux temperature. This desired condition is maintained by mixing the monomers under conditions such that polymerization does not proceed and introducing them into a reaction zone where the conditions are such as to permit polymerization. By regulating the rate of introduction of the mixed monomers so as to maintain at all times a constant, or substantially constant, reflux temperature the production of superior copolymers is achieved. If the reflux temperature increases, the rate of addition should be increased; and if the reflux temperature drops, indicating that the proportion of unreacted monomer in the reaction mass has increased, the rate of addition should be reduced. "Substantially constant reflux temperature" means a temperature which does not vary more than two degrees Centigrade in either direction; "substantially 80° C." meaning not more than 82° C., and not less than 78° C. The maintenance of such temperatures assures the continued presence of a constant ratio of water to monomer in the reaction mass and prevents the accumulation of the unreacted monomers. Other variables affecting the rate of polymerization and the physical and chemical characteristics of the copolymers are more easily controlled, conventional practices being used.

The polymerization is catalyzed by means of any water soluble peroxy compound, for example sodium peroxide, hydrogen peroxide, sodium perborate, the sodium salts of other peroxy acids, the potassium, ammonium and other water soluble salts of the above or other peroxy acids, and any other water soluble compound containing a peroxy radical (—O—O—). A wide variation in the quantity of the peroxy catalyst is possible. For example, from 0.001 to 1.0 per cent of the polymerizable monomer may be used. The catalyst may be charged at the outset of the reaction, or it may be added either continuously or in increments throughout the polymerization reaction. The latter method is preferred because it enables a more nearly uniform concentration of catalyst in the reaction mass, thereby producing a copolymer of more nearly the ideal chemical and physical properties.

Although the uniform distribution of the reagents throughout the reaction mass can be achieved by vigorous agitation it is generally desirable to promote the uniform distribution of reagents through the use of wetting agents, or emulsion stabilizers. Suitable agents for this purpose are the water soluble salts of fatty acids, such as sodium oleate and potassium stearate, mixtures of water soluble fatty acid salts, such as the common soaps prepared by the saponification of animal and vegetable oils, the "amino soaps," such as triethanol amine and dodecyl methyl amine, the rosin soaps, such as alkali metal salts of rosin acids and mixtures thereof, the water soluble salts of half esters of sulfuric acid and long chain alkyl alcohols, such as sodium lauryl sulfate, sulfonated hydrocarbons, such as alkyl aryl sulfonate and any other of the wide variety of wetting agents, which are in general organic compounds containing both hydrophobic and hydrophilic radicals. The quantity of emulsifying agent will depend upon the particular agents selected, the ratio of water and monomers to be used, and the other conditions of polymerization. In general, however, from 0.1 to 5 percent by weight of the monomer may be employed.

The temperature of polymerization is always the reflux temperature of the reaction mass, the actual temperature utilized may be varied by modifying the polymerization conditions, temperatures almost as high as the boiling point of water and almost as low as the boiling point of the more volatile monomer acryonitrile being feasible. In general temperatures from 70 to 95° C. may be employed, but preferred operations utilize temperatures between 80 and 85° C. The exact temperature of polymerization will depend upon the ratio of water to monomer in the reaction mass, the nature and concentration of the catalyst employed and the quantity and type of emulsifying agent.

The reagents may be combined by a wide variety of methods. In general the monomers are mixed separately and charged gradually to the reaction vessel containing water and all of the other essential ingredients, which are maintained at temperatures approximately that of the ultimate reflux. If desired the monomers may each be added in a separate stream, but it is more practicable to add a single stream of premixed monomers. In order to avoid unduly high concentrations of catalyst and emulsifier in the reaction mass at the beginning of the reaction, most of the emulsifier in the reaction may be mixed with the monomer and added simultaneously therewith to the reaction vessel. Preferably only a small portion of the catalyst is charged at the beginning of the reaction, and the remainder added either continuously or intermittently throughout the course of the reaction. The preferred manner of operation involves heating a body of water containing a small amount of catalyst and emulsifier to approximately the ultimate reflux temperature of the reaction, and thereafter gradually adding the mixed monomer in the proportions desired in the ultimate copolymer.

The emulsion polymerizations are preferably conducted in glass or glass-lined vessels which are provided with a means for agitating the contents thereof. Generally rotary stirring devices are the most effective means of assuring the intimate contact of the reagents, but other methods may successfully be employed, for example by rocking or tumbling the reactors. The polymerization equipment usually used is conventional in the art and any kind of apparatus which provides means for gradually adding monomers to a polymerization reaction may be used. It is essential that the monomers be charged at a rate such that a reflux at a constant temperature is maintained. Obviously a wide variety of automatic temperature controls may be used to assure the desired conditions. The ideal conditions are achieved by utilizing automatic valves on the monomer supply which are thermostatically regulated so as to provide at all times a reaction mass having a constant boiling point. These ideal conditions may be approximated by a mechanism which adds an increment of monomer mixture every time the temperature reaches a pre-determined maximum.

The method may be operated by withdrawing a continuous stream of the emulsion for further processing, and it may be operated semi-continuously by the gradual addition of a previously prepared mixture of monomers while allowing all of the reaction mass to remain in the reaction vessel until the reaction is complete. Because of its adaptability to industrial operations, the latter method is most generally employed. It will be apparent that in the practice of this semi-continuous method it is not possible to maintain a constant reflux temperature after all of the prepared charge of mixed monomer has been added. Accordingly, further polymerization is avoided by interrupting the reaction. This may be done by destroying one or more of the essential conditions of polymerization, for example by reducing the temperature, by adding polymerization inhibitor, by rapidly steam distilling the mass to eliminate unreacted monomers, or by interrupting the reaction by precipitating the emulsion with rapid stirring, freezing or the addition of a non-solvent, such as ethanol, or a water soluble salt.

Another expedient for more nearly attaining ideal operating conditions is to minimize the variation from the desired chemical composition encountered at the outset of polymerization. Any selected ratio of monomers will copolymerize to form a copolymer of definite proportions which are different from the monomer ratio selected. In order to assure that every polymer increment has the identical chemical composition it may be desirable to charge the reactor initially with a proportion of monomers different from the ratio of components desired in the copolymer, but so selected that the first increment of polymer has the said desired ratio of components. As soon as the polymerization begins, the monomers in the proportion desired in the ultimate polymer are charged in accordance with the method of this invention. Such procedure will produce an optimum product, but excellent approximation of the ideal conditions may be achieved by heating a body of water containing catalyst and emulsifying agent to approximately the ultimate reflux temperature, and then adding thereto the monomers of proportions desired in the ultimate copolymer at a rate such that a constant reflux temperature is maintained.

The method of this invention may be used to prepare a copolymer of very much more uniform chemical and physical properties than can be achieved by any method heretofore used. The method may be used to prepare copolymer compositions from two to 70 percent by weight of styrene or alpha-methyl-styrene and 98 to 30 percent of acrylonitrile. Preferred copolymers of 35 to 75 percent by weight of acrylonitrile and either alpha-methyl-styrene or styrene are useful in the preparation of molding compositions, whereas copolymers of 75 to 95 percent by weight of acrylonitrile are useful in the fabrication of fibers. In the preparation of molding compositions the practice of this invention will enable the production of clear, transparent articles whereas the prior art methods frequently produce hazy, clouded or completely opaque products. Articles fabricated from the copolymers prepared in accordance with this method have much higher tensile and flexural strength, frequently as much as 100 percent greater than those fabricated from resins prepared by prior art methods. The copolymers of more than 70 percent acrylonitrile are useful in the preparation of fibers by extruding solutions thereof through dies and precipitating the extruded polymer stream in a continuous form. In such fiber preparation methods it is desirable to use copolymers capable of being dissolved in suitable solvents, but the ultimate fiber must be as resistant as possible to the reaction of solvents. Such critical requirements necessitate the use of a copolymer which is extremely uniform in chemical composition and molecular structure. Through the practice of this invention this objective can be achieved.

Further details of the practice of the invention are set forth with respect to the following specific examples.

*Example 1*

A 1-liter, round-bottom flask having 3 necks was equipped with a thermometer, a reflux condenser and a mechanical stirring device, and was charged with 200 cc. of an aqueous solution containing fo ur percent by weight of a mixture of alkyl benzene sulfonate having an average of 24 carbon atoms per molecule and 0.2 gram of potassum persulfate. This solution was heated to 80° C. and a mixture of 30 grams of freshly distilled styrene and 70 grams of freshly distilled acrylonitrile was added dropwise at such rates that the reflux temperature of the reaction mixture was maintained at 80±2° C. throughout the polymerization. The reaction required one hour for completion and the resulting emulsion was immediately poured into one liter of ethanol. The copolymer thereby precipitated was collected on a filter and was washed with warm ethanol and finally with warm water. The solid pulverulent resin so obtained was dried and molded under compression. These transparent moldings were subjected to standard physical measurements, and were found to have a flexural strength of 26,700 pounds per square inch, and a tensile strength of 13,250 pounds per square inch. The product was subjected to A. S. T. M. oil bath heat distortion point test and a value of 97.5° C. was observed. The product which was a copolymer of 65 percent acrylonitrile by weight was found to be resistant to common dry cleaning solvents, such as Stodard's solvent, carbon tetrachloride and tetra-chloroethylene. The product was soluble in actone to form clear, colorless solutions.

The above procedure was duplicated except that all of the monomer was charged to the reaction before the polymerization was begun. Polymerization was then begun by heating the flask to 75° C. After completion of the polymerization the copolymer was recovered by pouring the resulting emulsion into ethanol and filtering off the resultant powdered solid. Compression moldings prepared from this copolymer were opaque and very brittle, fracturing without elongation. A flexural strength of 13,800 pounds per square inch and a tensile strength of 9,600 pounds per square inch were observed. Solutions of this polymer in acetone were clouded indicating non-homogenity of the solid polymer.

*Example 2*

Using the procedure set forth in Example 1, 60 grams of acrylonitrile and 40 grams of styrene were copolymerized by adding the mixed monomers dropwise at such rates that a constant temperature of 75±2° C. was maintained. The addition required 4.5 hours. The resulting emulsion was precipitated immediately by pouring into one liter of ethanol. The solid pulverent powder was processed by filtration, by washing with ethanol and water, and by drying. The product which was found to be a copolymer of 55 percent by weight of acrylonitrile was compression molded to form transparent moldings having a flexural strength of 25,000 pounds per square inch and a tensile strength of 13,000 pounds per square inch. When strained these moldings elongated slightly before breaking. The heat distortion point of this polymer was 98° C., when measured by the A. S. T. M. oil bath method. The polymer was insoluble in acetone to form clear solution but was insoluble in tetrachlorethylene, carbon tetrachloride and Stodard's solvent.

*Example 3*

Using the apparatus and procedure described in Example 1, 50 grams of alpha-methyl-styrene and 50 grams of acrylonitrile were polymerized by mixing the monomer and adding them dropwise to an aqueous medium containing catalyst and emulsifying agent. The rate of addition was such that a substantially constant reflux temperature was maintained at 80±2° C. Clear, transparent moldings were prepared having a flexural strength of 23,300 pounds per square inch and a tensile strength of 12,400 pounds per square inch. The product was found to be a copolymer of 41.5 weight percent acrylonitrile.

*Example 4*

Using a procedure identical to that set forth in Example 1, a mixture of 65 grams of alpha-methyl-styrene and 35 grams of freshly distilled acrylonitrile were polymerized at a substantially constant reflux temperature of 80° C. Four hours were required to complete the reaction. The resulting product was found to be a copolymer of 28.7 percent acrylonitrile, was compression molded and samples so obtained were found to have a flexural strength of 17,700 pounds per square inch and a tensile strength of 10,100 pounds per square inch. The heat distortion point of the copolymer was 114° C., and samples were boiled without being distorted.

Example 5

Using the procedure described in Example 1, 50 grams of freshly distilled styrene and 50 grams of freshly distilled acrylonitrile were polymerized by adding them dropwise to the aqueous medium maintained at 80±2° C. Transparent moldings obtained under compression were tested and found to have a flexural strength of 23,000 pounds per square inch and a tensile strength of 12,500 pounds per square inch. This product was a copolymer of 46.5 percent of acrylonitrile by weight.

Example 6

A 2-liter flask was provided with a reflux condenser, a thermometer and a rotary stirring mechanism, and was charged with 600 cc. of water, 0.6 gram of Acto 450 (a mixture of alkyl aryl sodium sulfonates having 20 to 26 carbon atoms) and 1.0 gram of potassium persulfate. The contents of the flask were heated to 85° C., and then a mixture of 180 grams of acrylonitrile and 120 grams of styrene were added dropwise at rates which were periodically changed so as to maintain a temperature of 85±2° C. The mixed monomers contained an additional 0.6 gram of Acto 450, and 0.9 gram of dodecyl mercaptan. Three hours and fifty minutes were required to complete the reaction at which time the emulsion was rapidly steam distilled to remove the 55 grams of unreacted monomer which remained. The emulsion was then dried directly and samples were prepared by injection molding. The samples so prepared were found to have a flexural strength of 24,000 pounds per square inch.

Example 7

Using the procedure described in Example 6, 187 grams of styrene and 62.5 grams of acrylonitrile were copolymerized by adding them dropwise to an aqueous medium maintained at 80±2° C. After five hours and fifteen minutes the addition was completed and the resulting emulsion was rapidly steam distilled to remove unreacted monomer. Transparent moldings were obtained exhibiting a flextural strength of 21,000 pounds per square inch, tensile strength of 9,000 pounds per square inch, and a heat distortion (A. S. T. M. oil bath) 100.5° C. This product was a copolymer of 25.8 weight percent of acrylonitrile.

Example 8

A 1-liter flask was charged with 200 cc. of water, 1.0 grams of di-2-ethylhexyl sodium sulfo succinate and 10 cc. of a one percent potassium persulfate solution. After heating the aqueous solution to 90° C., a mixture of 85 grams of acrylonitrile and 15 grams of styrene was added dropwise at a rate which enabled the maintenance of the reflux temperature at 90±2° C. At the end of each hour 5 cc. of one percent potassium persulfate was added to the reaction mixture. The addition of monomer was complete in two hours and twenty minutes, and the reaction mass was rapidly steam distilled to remove unreacted monomers. The resulting polymer was dissolved and extruded to form fibers of high tensile strength.

Although the invention has been described with respect to specific modifications, it is not intended that the details thereof shall be construed as limitations upon the scope of the invention except to the extent incorporated in the following claims.

We claim:

1. A method of preparing copolymers which comprises continuously adding from 30 to 98 percent by weight of acrylonitrile and from 70 to two percent of a compound of the group consisting of styrene and alpha-methyl-styrene to an aqueous medium containing a peroxy catalyst at the reflux temperature, said addition being made at rates such that the reflux temperature remained constant.

2. In a method of preparing copolymers of 30 to 98 percent by weight of acrylonitrile and 70 to two percent of a compound of the group consisting of styrene and alpha-methyl styrene by an emulsion technique in the presence of a peroxy catalyst, the step of adding the monomers in proportions desired in the polymer to the aqueous medium at the reflux temperature, at rates such as to maintain a constant reflux temperature.

3. A method of preparing copolymers which comprises continuously adding a mixture of 35 to 75 percent by weight of acrylonitrile and from 25 to 65 percent of a compound of the group consisting of styrene and alpha-methyl-styrene to an aqueous medium containing a peroxy catalyst and an emulsifying agent at the reflux temperature, said addition being made at rates such that the reflux temperature remained constant.

4. In a method of preparing copolymers of 35 to 75 percent by weight of acrylonitrile and 25 to 65 percent of a compound of the group consisting of styrene and alpha-methyl-styrene by an emulsion technique in the presence of a peroxy catalyst, the step of adding a previously prepared monomer mixture to the aqueous medium at the reflux temperature, at rates such as to maintain a constant reflux temperature.

5. A method of preparing copolymers which comprises continuously adding a mixture of 30 to 98 percent by weight of acrylonitrile and from 70 to two percent of a compound of the group consisting of styrene and alpha-methyl-styrene to an aqueous medium containing a peroxy catalyst and an emulsifying agent at the reflux temperature, at rates such as to maintain a constant reflux temperature, and interrupting the polymerization when all of the mixed monomer has been added.

6. In a method of preparing copolymers of 30 to 98 percent by weight of acrylonitrile and 70 to two percent of a compound of the group consisting of styrene and alpha-methyl-styrene by an emulsion technique in the presence of a peroxy catalyst, the step of adding a previously prepared monomer mixture to the aqueous medium at reflux temperatures, at rates such as to maintain a constant reflux temperature, and interrupting the polymerization when all of the mixed monomer has been added.

7. A method of preparing copolymers of 30 to 98 percent by weight of acrylonitrile and 70 to two percent of a compound of the group consisting of styrene and alpha-methyl-styrene, which comprises mixing water and a monomer mixture which upon polymerization will yield a copolymer of the desired monomeric components, subjecting the mixture to polymerization at the reflux temperature in the presence of a peroxy catalyst and an emulsifying agent while continuously charging the monomer in the proportion desired in the ultimate copolymer at rates such that the reflux temperature of the reaction mass is constant.

8. In a method of preparing copolymers of 30 to 98 percent by weight of acrylonitrile and from 70 to two percent of a compound of the group consisting of styrene and alpha-methyl-styrene by an emulsion polymerization technique in the presence of a peroxy catalyst and an emulsifying agent, the steps of mixing water and a mixture of monomer which will upon polymerization produce a copolymer of the desired content, and polymerizing in the presence of a peroxy catalyst and an emulsifying agent at the reflux temperature while adding a mixture of monomer in the proportions desired in the copolymer and at such rates that the reflux temperature remains constant.

9. A method of preparing copolymers of 30 to 98 percent by weight of acrylonitrile and 70 to two percent of a compound of the group consisting of styrene and alpha-methyl-styrene, which comprises mixing water and a monomer mixture which upon polymerization will yield a copolymer of the desired monomeric components, subjecting the mixture to polymerization at the reflux temperature at substantially atmospheric pressure in the presence of a peroxy catalyst and an emulsifying agent while continuously charging the monomer in the proportion desired in the ultimate copolymer at rates such that the reflux temperature of the reaction mass is constant at a temperature between 70 and 95° C., and interrupting the polymerization as soon as the addition of monomer is completed.

10. In a method of preparing copolymers of 30 to 98 percent by weight of acrylonitrile and from 70 to two percent of a compound of the group consisting of styrene and alpha-methyl-styrene by an emulsion polymerization technique at substantially atmospheric pressure in the presence of a peroxy catalyst and an emulsifying agent, the steps of mixing water and a mixture of monomer which will upon polymerization produce a copolymer of the desired content, and polymerizing in the presence of a peroxy catalyst and an emulsifying agent at the reflux temperature while adding a mixture of monomer in the proportions desired in the copolymer and at such rates that the reflux temperature remains constant at a temperature between 70 and 95° C., and interrupting the polymerization as soon as the addition of monomer is completed.

EARL C. CHAPIN.
GEORGE E. HAM.

REFERENCES CITED

The following references are of record in the file of this patent:

UNITED STATES PATENTS

| Number | Name | Date |
|---|---|---|
| 2,100,900 | Fikentscher et al. | Nov. 30, 1937 |
| 2,420,330 | Shriver et al. | May 13, 1947 |